US010833426B2

(12) United States Patent
Hoenle et al.

(10) Patent No.: US 10,833,426 B2
(45) Date of Patent: Nov. 10, 2020

(54) METHOD FOR PRODUCING AN ELECTRICALLY CONDUCTIVE BOND BETWEEN AN ELECTRICAL LINE AND AN ELECTRICALLY CONDUCTIVE COMPONENT AND ASSEMBLY PRODUCED USING THE METHOD

(71) Applicant: ElringKlinger AG, Dettingen (DE)

(72) Inventors: Udo Hoenle, Rottenburg (DE); Mark Laderer, Grabenstetten (DE); Moritz Bertsch, Dettinqen/Erms (DE); Ulrich Sauter, Metzingen (DE)

(73) Assignee: ElringKlinger AG, Dettingen (DE)

( * ) Notice: Subject to any disclaimer, the term of this patent is extended or adjusted under 35 U.S.C. 154(b) by 0 days.

(21) Appl. No.: 14/804,989

(22) Filed: Jul. 21, 2015

(65) Prior Publication Data
US 2015/0325930 A1 Nov. 12, 2015

Related U.S. Application Data

(63) Continuation of application No. PCT/EP2014/051244, filed on Jan. 22, 2014.

(30) Foreign Application Priority Data

Jan. 24, 2013 (DE) .......................... 10 2013 201 167

(51) Int. Cl.
H01R 4/18 (2006.01)
H01R 4/20 (2006.01)
(Continued)

(52) U.S. Cl.
CPC .............. H01R 4/18 (2013.01); H01R 4/029 (2013.01); H01R 4/20 (2013.01); H01R 43/048 (2013.01);
(Continued)

(58) Field of Classification Search
CPC .......... H01R 4/187; H01R 4/029; H01R 4/18; H01R 4/20; H01R 43/048; H01R 43/28;
(Continued)

(56) References Cited

U.S. PATENT DOCUMENTS 2,275,163 A * 3/1942 Thomas, Jr. ............. H01R 4/20
439/879
2,347,713 A * 5/1944 Rogoff ................. H01R 43/058
439/879
(Continued)

FOREIGN PATENT DOCUMENTS

DE         42 32 626      3/1994
DE   20 2006 008 713     8/2006
(Continued)

Primary Examiner — Peter Dungba Vo
Assistant Examiner — Kaying Kue
(74) Attorney, Agent, or Firm — Womble Bond Dickinson (US) LLP

(57) ABSTRACT

To provide a method for producing an electrically conductive bond between an electrical line, which includes a plurality of individual conductors, and an electrically conductive component, including producing from a crimp element blank a crimp element enclosing portions of the individual conductors, the crimp element including a continuous side and a discontinuous side, at which edge regions of the crimp element lie opposite one another, and substance-to-substance bonding of the crimp element with a contact surface of the component, which is simple to carry out and nevertheless always results in a robust substance-to-substance bond between the crimp element and the component, it is proposed that the crimp element be produced in such a way that the continuous side of the crimp element includes two bearing surfaces which are spaced from one another, at which the crimp element is substance-to-substance bondable to the contact surface of the component.

6 Claims, 5 Drawing Sheets

(51) Int. Cl.
*H01R 43/048* (2006.01)
*H01R 4/02* (2006.01)
*H01R 43/28* (2006.01)
*H01R 43/058* (2006.01)

(52) U.S. Cl.
CPC .......... *H01R 43/28* (2013.01); *H01R 43/058* (2013.01); *Y10T 29/4922* (2015.01)

(58) Field of Classification Search
CPC .............. H01R 43/058; Y10T 29/4922; Y10T 29/4921–49215
USPC .................................................. 29/874–884
See application file for complete search history.

(56) References Cited

U.S. PATENT DOCUMENTS

| | | | | |
|---|---|---|---|---|
| 2,748,452 A * | 6/1956 | Pierce | ................. | H01R 13/115 29/865 |
| 2,806,215 A * | 9/1957 | Redslob | ................ | H01R 43/16 439/868 |
| 3,443,256 A * | 5/1969 | Sol | ......................... | H01R 4/187 336/192 |
| 3,459,355 A * | 8/1969 | Metzger, Jr. | ............ | H01L 24/05 228/1.1 |
| 3,650,706 A * | 3/1972 | Parsons | .............. | H01R 43/0482 428/51 |
| 3,717,842 A * | 2/1973 | Douglas, Jr. | ........... | H01R 4/187 29/860 |
| 3,734,992 A * | 5/1973 | Masino et al. | ......... | H01R 43/20 264/159 |
| 3,798,347 A * | 3/1974 | Harding | ............... | H01R 4/2495 174/84 C |
| 3,892,459 A * | 7/1975 | Dittmann | ............... | H01R 4/188 439/442 |
| 3,955,044 A * | 5/1976 | Hoffman | ................ | H01R 4/203 174/84 C |
| 4,142,771 A * | 3/1979 | Barnes | .................... | H01R 4/184 174/84 C |
| 4,395,081 A * | 7/1983 | Melys | ....................... | H01R 4/64 439/92 |
| 4,703,990 A * | 11/1987 | Assmann | ............. | H01R 12/675 439/404 |
| 4,705,336 A * | 11/1987 | Bonhomme | ......... | H01R 13/035 439/587 |
| 4,824,550 A * | 4/1989 | Ker | .................... | G01N 27/4067 204/427 |
| 4,966,565 A * | 10/1990 | Dohi | ....................... | H01R 4/029 439/874 |
| 4,969,260 A * | 11/1990 | Kondo | ..................... | H01R 4/20 29/863 |
| 5,025,554 A * | 6/1991 | Dohi | ........................ | H01R 4/187 29/860 |
| 5,230,967 A * | 7/1993 | Radmall | ................ | H01M 2/26 29/623.4 |
| 5,239,749 A * | 8/1993 | Fujimaki | ................ | H01R 4/185 174/84 C |
| 5,361,491 A * | 11/1994 | Oomachi | ............... | H01L 21/486 29/852 |
| 5,532,433 A * | 7/1996 | Endo | ........................ | H01R 4/20 174/77 R |
| 5,561,267 A * | 10/1996 | Fudoo | ..................... | H01R 4/185 174/84 C |
| 5,966,805 A * | 10/1999 | Akiha | .................. | H05K 3/4015 29/831 |
| 6,000,976 A * | 12/1999 | Takagishi | ........... | H01R 13/4223 29/882 |
| 6,184,471 B1 * | 2/2001 | Asakura | ........... | H01R 13/65914 174/78 |
| 6,290,556 B1 * | 9/2001 | Howland | ................ | H01R 4/188 439/879 |
| 6,293,594 B1 * | 9/2001 | Safarevich | ................ | A61N 1/05 174/84 R |
| 6,369,474 B1 * | 4/2002 | Tanaka | ................... | H01R 4/187 29/860 |
| 6,641,027 B2 * | 11/2003 | O'Connell | ............ | B23K 20/10 228/1.1 |
| 6,658,725 B1 | 12/2003 | Liu | | |
| 6,896,562 B2 * | 5/2005 | Takizawa | ................ | H02K 3/50 439/874 |
| 7,091,419 B2 * | 8/2006 | Muller | ................... | H01R 4/024 174/84 R |
| 7,336,008 B2 * | 2/2008 | Horioka | .............. | H02K 11/046 310/68 D |
| 7,338,334 B2 * | 3/2008 | Kumakura | ............. | H01R 43/16 439/866 |
| 7,465,606 B2 * | 12/2008 | DeWys | ................ | B23K 11/002 438/106 |
| 7,544,892 B2 * | 6/2009 | Susai | ..................... | H01R 4/188 174/84 C |
| 7,611,392 B2 * | 11/2009 | Osborn, Jr. | ............. | H01R 4/185 29/874 |
| 7,705,265 B2 * | 4/2010 | Asakura | .......... | H01R 43/0221 219/121.64 |
| 7,828,610 B2 * | 11/2010 | Lehmann | ............... | H01R 4/187 439/874 |
| 7,901,257 B2 * | 3/2011 | Okamura | ............... | H01R 4/185 439/877 |
| 8,210,884 B2 * | 7/2012 | Corman | ................. | H01R 4/185 439/877 |
| 8,235,276 B2 * | 8/2012 | Ohnuma | ................. | H01R 4/187 228/110.1 |
| 8,288,653 B2 * | 10/2012 | Stroh | ................. | H01R 43/0207 174/74 R |
| 8,303,354 B2 * | 11/2012 | Ootsuka | ............... | H01R 4/185 439/877 |
| 8,609,988 B2 * | 12/2013 | Sagawa | ................. | H01R 4/029 174/84 R |
| 8,628,363 B2 * | 1/2014 | Kobayashi | ............. | H01R 4/185 439/877 |
| 8,723,040 B2 * | 5/2014 | Sakura | ..................... | H01R 4/70 174/74 R |
| 8,826,533 B2 * | 9/2014 | Seifert | ................... | H01R 4/187 29/857 |
| 9,004,958 B2 * | 4/2015 | Nabeta | ..................... | H01R 4/18 439/877 |
| 9,325,135 B2 * | 4/2016 | Bauer | ..................... | H01R 4/184 |
| 9,331,399 B2 * | 5/2016 | Itou | ............................. | H01R 4/72 |
| 9,437,958 B2 * | 9/2016 | Naganishi | ................ | H01R 4/70 |
| 9,531,088 B2 * | 12/2016 | Kihara | ....................... | H01R 4/20 |
| 9,647,348 B2 * | 5/2017 | Trafton | ................... | H01R 4/625 |
| 9,812,835 B2 * | 11/2017 | Kern | ......................... | H01R 4/187 |
| 9,991,608 B2 * | 6/2018 | Trafton | ................... | H01R 4/184 |
| 2002/0162683 A1 * | 11/2002 | Fujiwara | ................ | H01R 4/183 174/74 R |
| 2003/0098332 A1 * | 5/2003 | Loprire | .................. | B23K 20/10 228/110.1 |
| 2003/0100228 A1 * | 5/2003 | Bungo | ................... | H01R 43/20 439/701 |
| 2004/0029454 A1 | 2/2004 | Onuma et al. | | |
| 2004/0088857 A1 * | 5/2004 | Fujimoto | ........... | H01R 43/0207 29/871 |
| 2004/0235364 A1 * | 11/2004 | Matsumoto | ........ | H01R 13/5812 439/752 |
| 2006/0118932 A1 * | 6/2006 | Nanba | ...................... | H01L 24/29 257/678 |
| 2006/0205289 A1 * | 9/2006 | Kumakura | ............. | H01R 43/16 439/866 |
| 2007/0068991 A1 * | 3/2007 | Handel | .................. | H01R 4/026 228/1.1 |
| 2007/0122697 A1 * | 5/2007 | Wutz | ........................ | H01M 2/30 429/181 |
| 2007/0166581 A1 * | 7/2007 | Terazaki | ........... | H01M 8/04022 422/199 |
| 2008/0139056 A1 * | 6/2008 | Kumakura | ............. | H01R 43/16 439/866 |
| 2008/0145972 A1 * | 6/2008 | Ishikawa | ............... | H05K 3/1233 438/120 |

(56) References Cited

U.S. PATENT DOCUMENTS

| | | | | |
|---|---|---|---|---|
| 2008/0233807 | A1* | 9/2008 | Newton | H01R 13/745 |
| | | | | 439/709 |
| 2009/0218134 | A1* | 9/2009 | Stroh | H01R 4/187 |
| | | | | 174/74 R |
| 2010/0003867 | A1* | 1/2010 | Lehmann | H01R 43/0207 |
| | | | | 439/874 |
| 2010/0035485 | A1* | 2/2010 | Okamura | H01R 4/185 |
| | | | | 439/877 |
| 2010/0300748 | A1* | 12/2010 | Matsuoka | H01R 13/5208 |
| | | | | 174/74 A |
| 2011/0094797 | A1* | 4/2011 | Otsuka | H01R 4/185 |
| | | | | 174/84 C |
| 2011/0275232 | A1* | 11/2011 | Duesterhoeft | H02S 40/34 |
| | | | | 439/276 |
| 2012/0267161 | A1* | 10/2012 | Yano | H01G 4/228 |
| | | | | 174/520 |
| 2012/0324727 | A1* | 12/2012 | Seifert | H01R 43/048 |
| | | | | 29/867 |
| 2013/0130569 | A1* | 5/2013 | Sato | H01R 4/206 |
| | | | | 439/882 |
| 2013/0175069 | A1* | 7/2013 | Katou | H01R 43/20 |
| | | | | 174/113 R |
| 2013/0337697 | A1* | 12/2013 | Buschel | H01R 12/58 |
| | | | | 439/660 |
| 2014/0327444 | A1* | 11/2014 | Aparicio Rollan | G01R 1/203 |
| | | | | 324/426 |

FOREIGN PATENT DOCUMENTS

| | | |
|---|---|---|
| JP | H05-303983 | 11/1993 |
| JP | H06-73868 | 10/1994 |
| WO | WO 2008/014981 | 2/2008 |

* cited by examiner

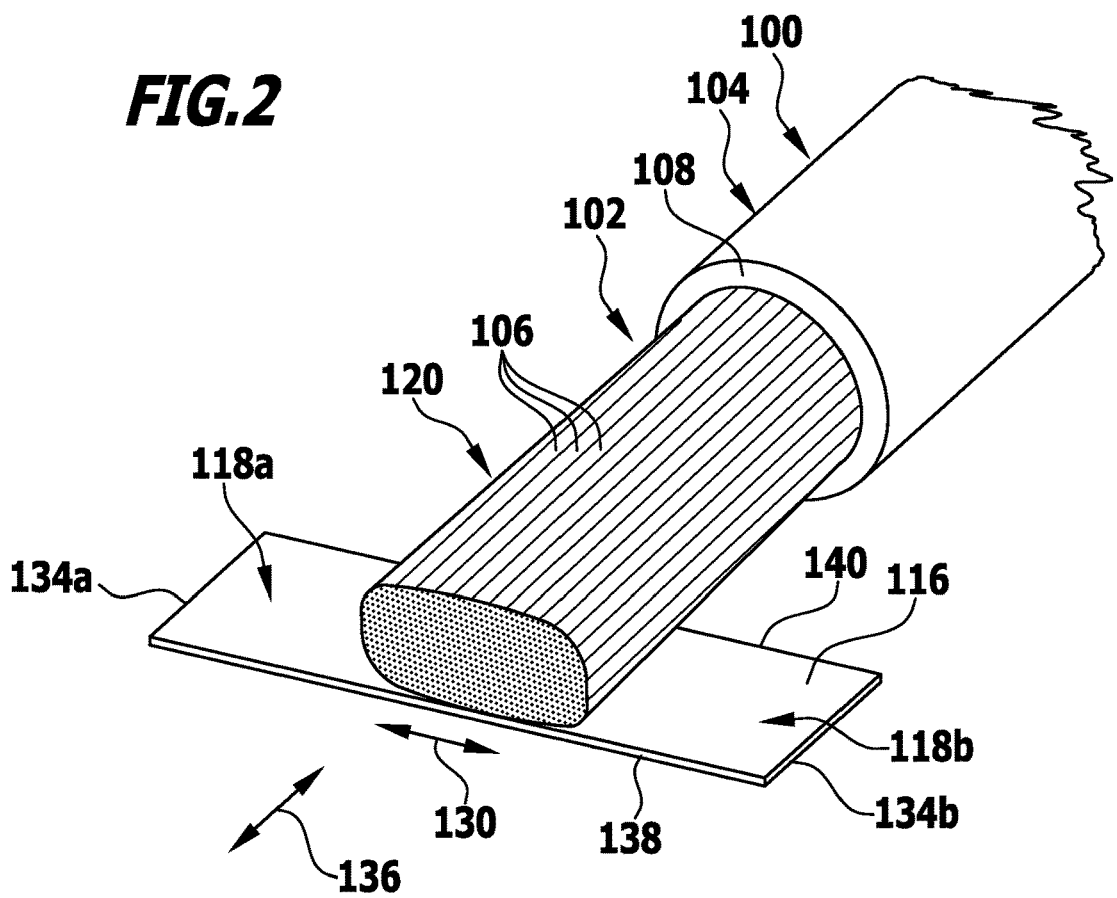
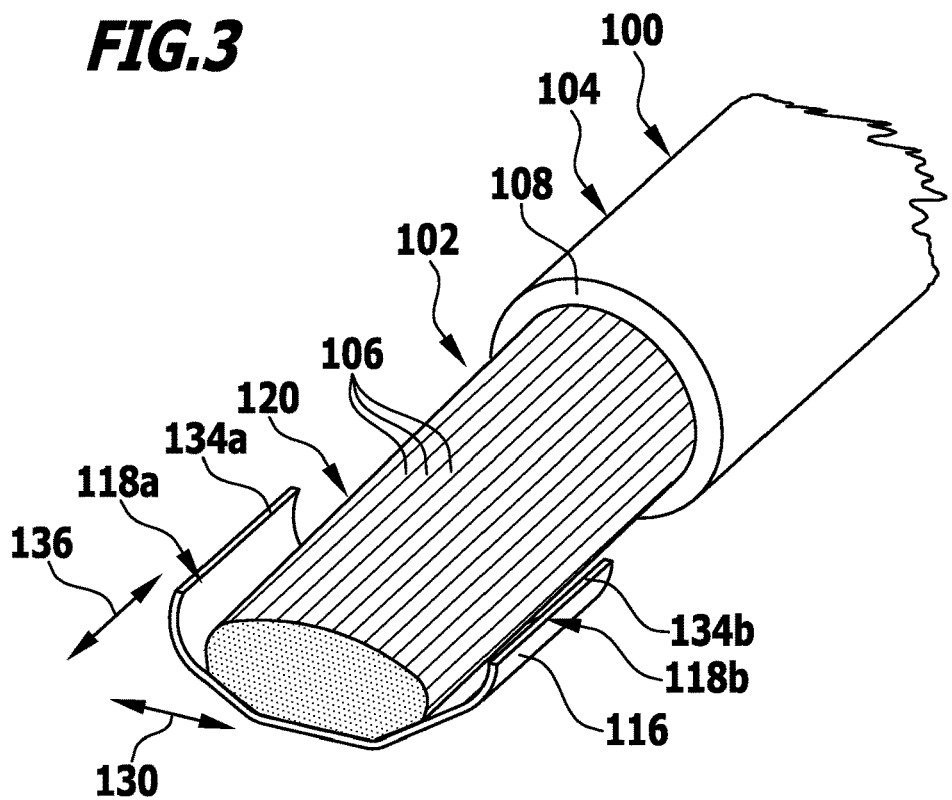

METHOD FOR PRODUCING AN ELECTRICALLY CONDUCTIVE BOND BETWEEN AN ELECTRICAL LINE AND AN ELECTRICALLY CONDUCTIVE COMPONENT AND ASSEMBLY PRODUCED USING THE METHOD

CROSS-REFERENCE TO RELATED APPLICATIONS

The present application is a continuation of international application number PCT/EP2014/051244, filed on Jan. 22, 2014, which claims priority to German patent number 10 2013 201 167.9, filed on Jan. 24, 2013, the entire specification of both being incorporated herein by reference.

FIELD OF THE DISCLOSURE

The present invention relates to a method for producing an electrically conductive bond between an electrical line, which comprises a plurality of individual conductors, and an electrically conductive component, the method comprising the following method steps:
producing from a crimp element blank a crimp element enclosing portions of the individual conductors, the crimp element comprising a continuous side and a discontinuous side, at which edge regions of the crimp element lie opposite one another; and
substance-to-substance bonding of the crimp element at the continuous side thereof or at the discontinuous side thereof with a contact surface of the component.

BACKGROUND

In known methods of this type, the crimp element is formed in the form of a "B-crimp", which has a substantially B-shaped cross-section. On its continuous side, such a B-crimp has a substantially planar bearing surface, while on the discontinuous side of the B-crimp two curved bearing surfaces spaced from one another in the transverse direction of the crimp element by a recess located between them are formed on crests of the crimp element remote from the continuous side of the crimp element.

Such a B-crimp may be applied, during substance-to-substance bonding of the crimp element to the component, in two different orientations onto a contact surface of the component, namely with the continuous side facing the component or with the discontinuous side facing the component.

If the continuous side of the B-crimp faces the component, the crimp element is substance-to-substance bonded, for example welded, along the entire planar bearing surface of the continuous side thereof to the contact surface of the component.

If the B-crimp faces the component with its discontinuous side, the crimp element is substance-to-substance bonded, in particular welded, to the component at two contact zones, in particular weld zones, which are spaced from one another on the bearing surfaces which are spaced from one another.

The peel forces, i.e., the shear forces, needed to detach the crimp element from the component are very different in these two alternative orientations of the crimp element relative to the component, specifically the peel forces are markedly higher if the crimp element faces the component with its discontinuous side than in the orientation in which the crimp element rests with its continuous side against the component.

The reason for this in particular resides in the greater localization of the energy input into the contact zones between the crimp element and the component during substance-to-substance bonding (in particular during welding) and in the greater localization of the shear forces acting on the contact zones between the crimp element and the component if the contact zones are smaller.

To achieve higher peel forces and thus a more robust substance-to-substance bond between the crimp element and the component, the crimp element must thus always be applied to the component in the orientation in which the discontinuous side of the crimp element faces the component.

SUMMARY OF THE INVENTION

It is an object of the present invention to provide a method for producing an electrically conductive bond between an electrical line and an electrically conductive component of the above-stated type, which method is simple to carry out and nevertheless always results in a robust, substance-to-substance bond between the crimp element and the component.

This object is achieved according to the invention in a method having the features of the pre-characterizing clause of claim 1 in that the crimp element is produced in such a way that the continuous side of the crimp element comprises two bearing surfaces spaced from one another, at which the crimp element is substance-to-substance bondable to the contact surface of the component.

The concept underlying the present invention is thus that of configuring the geometry of the crimp element in such a way that the peel forces are sufficiently high even if the crimp element is applied with its continuous side against the component.

Because the crimp element with the geometry according to the invention can be used on both sides, this crimp element and the method carried out therewith to produce an electrically conductive bond between an electrical line and an electrically conductive component is particularly easy to assemble and fault-tolerant.

The crimp element used according to the invention may in particular have a cross-section which resembles the number 8.

In one particular configuration of the method according to the invention, provision is made for a recess to be produced on the continuous side of the crimp element.

Such a recess may in particular be produced by impressing.

Such impressing may proceed for example using a die provided in a crimping tool, which die is preferably substantially complementary in form to the recess. A method for producing a crimp element from a crimp element blank using a crimping tool is described for example in DE 10 2010 035 424 A1, to which reference is made in this respect and which is incorporated by reference into this description.

In a preferred configuration of the invention, provision is made for the recess to extend from a front edge of the crimp element as far as a rear edge of the crimp element.

In the method according to the invention, the crimp element preferably takes the form of a (modified) B-crimp, which has a discontinuous side and a continuous side, a recess preferably being formed on the continuous side of the B-crimp.

The crimp element may in principle be formed from any electrically conductive, workable material.

Preferably, the crimp element blank contains a metallic material, for example copper or a copper alloy, and preferably is formed substantially completely from a metallic material, in particular from copper or a copper alloy.

Substance-to-substance bonding of the crimp element with the component preferably proceeds by a welding process, in particular by an ultrasonic welding process.

In a preferred configuration of the method according to the invention, the component is formed as a cell connector for electrically conductively bonding cell terminals of electrochemical cells of an electrochemical device.

The electrically conductive bond between the electrical line and such a cell connector may in particular serve to transfer the electrical potential prevailing at the connection point of the cell connector via the electrical line to a monitoring device of the electrochemical device.

Alternatively or in addition, the method according to the invention may be used to produce an electrically conductive bond between a temperature sensor and a monitoring device of the electrochemical device.

Thus, as a result of the electrically conductive bond, it may in particular be possible to carry out individual cell monitoring of the electrochemical cells of an electrochemical device with regard to temperature and/or voltage.

The present invention further relates to an assembly, which comprises an electrical line, which comprises a plurality of individual conductors, a crimp element enclosing portions of the individual conductors and having a continuous side and a discontinuous side, at which edge regions of the crimp element lie opposite one another, and an electrically conductive component substance-to-substance bonded to the crimp element.

A further object of the present invention is to configure such an assembly such that it is simple to assemble and nevertheless always has a robust substance-to-substance bond between the crimp element and the component.

This object is achieved according to the invention in an assembly having the features of the pre-characterizing clause of claim 10 in that the continuous side of the crimp element comprises two bearing surfaces which are spaced from one another, at which the crimp element is substance-to-substance bonded with a contact surface of the component.

This particular geometry of the crimp element ensures that the peel forces of the bond between the crimp element and the component are sufficient even if the crimp element is applied with its continuous side against the component.

Claims 11 to 15 relate to particular configurations of the assembly according to the invention, the features and advantages of which have already been explained above in connection with particular configurations of the method according to the invention.

By means of the method according to the invention, the stranded wires or individual conductors of an electrical line can be precompacted by enclosing portions of the individual conductors with a crimp element and the crimp element can be substance-to-substance bonded, in particular welded, with an electrically conductive component.

The particular geometry of the crimp element makes it possible to use the crimp element on both sides, so resulting in more uniform peel forces, which are preferably substantially independent of the orientation of the crimp element relative to the component.

Further features and advantages of the invention constitute the subject matter of the following description and of the graphical representation of an exemplary embodiment.

BRIEF DESCRIPTION OF THE DRAWINGS

FIGS. 2 and 3 are schematic perspective representations which illustrate the production of a crimp element from a crimp element blank at end portions of the individual conductors of the electrical line;

Identical or functionally equivalent elements are provided with the same reference signs in all the figures.

DETAILED DESCRIPTION OF THE INVENTION

Figure 1:
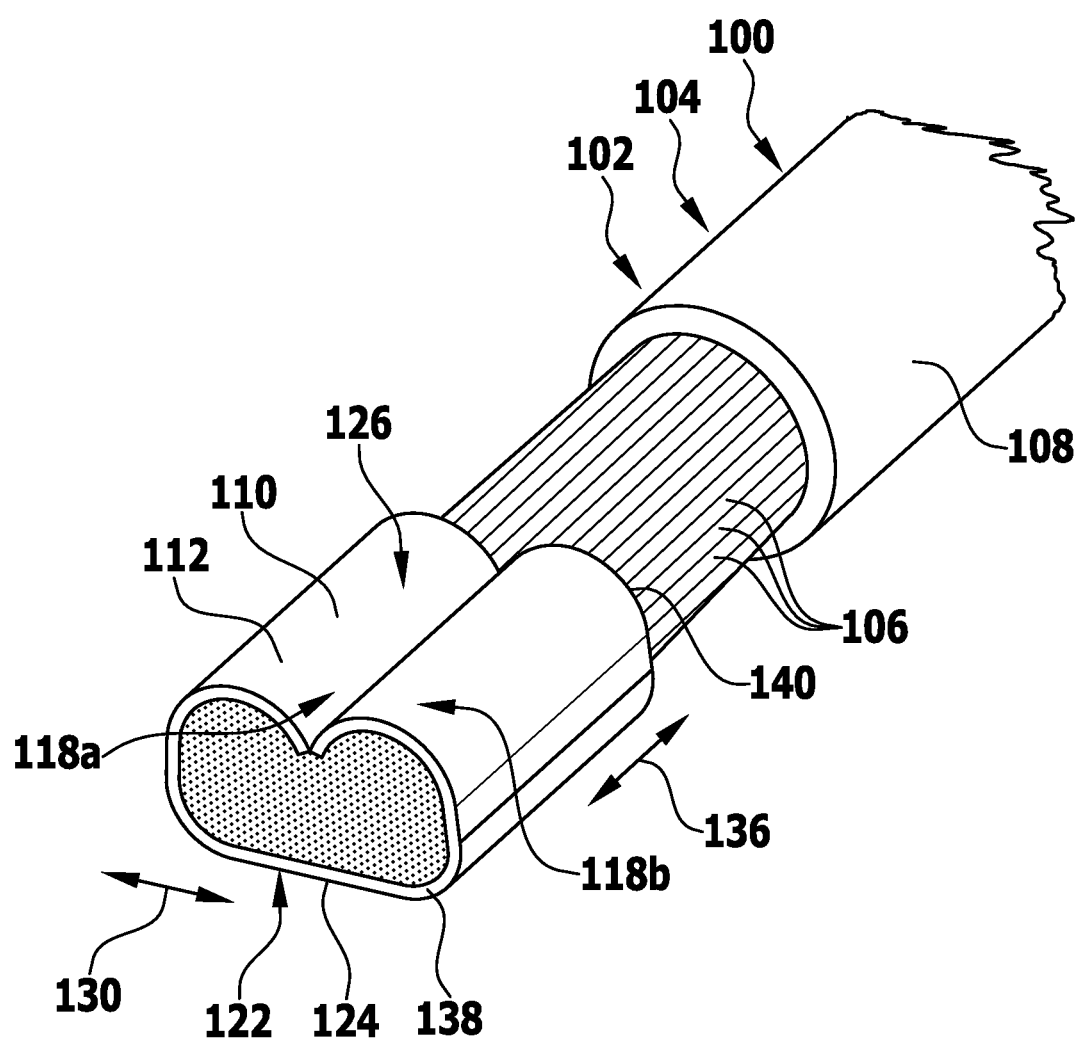
FIG. 1 is a schematic perspective representation of an end region of an electrical line, which comprises a plurality of individual conductors, which have been enclosed by a crimp element in the form of a B-crimp.
Figure 4:
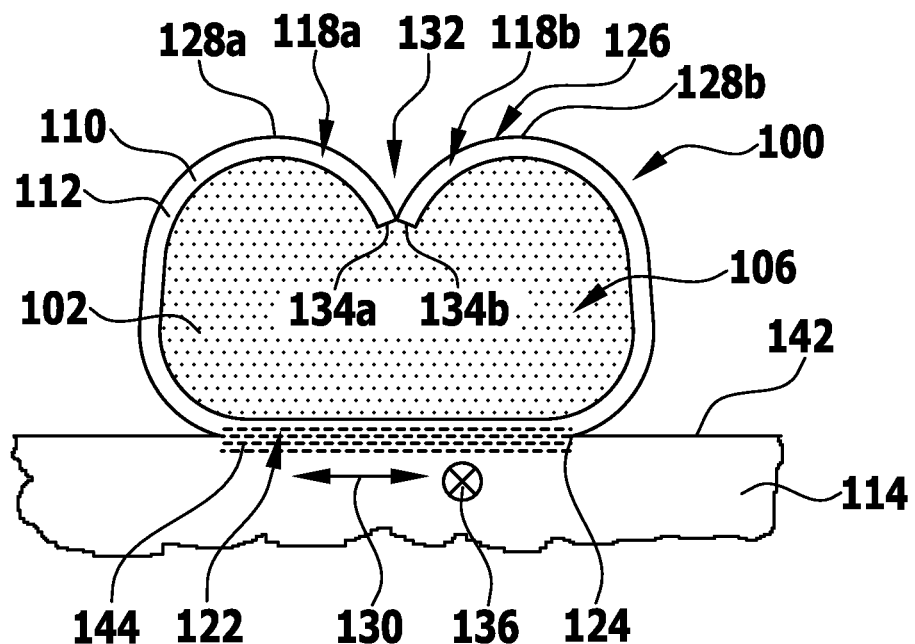
FIG. 4 shows a schematic section through an assembly comprising an electrical line with a plurality of individual conductors, a crimp element in the form of a B-crimp enclosing end portions of the individual conductors and a component welded to a continuous side of the crimp element.
Figure 5:
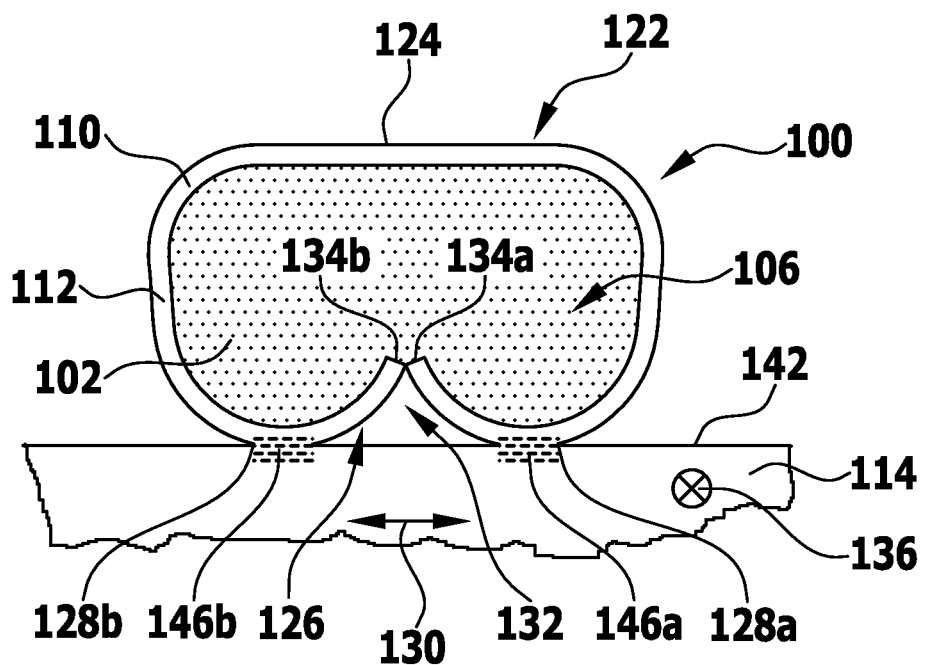
FIG. 5 shows a schematic section through an alternative embodiment of the assembly of FIG. 4, in which the component is welded to a discontinuous side of the crimp element.

An assembly according to the prior art illustrated in FIGS. 1 to 5 and designated overall as 100 comprises an electrical line 102 in the form of a cable 104 which comprises a plurality of stranded wires or individual conductors 106 and an electrically insulating covering 108, a crimp element 110 in the form of a B-crimp 112, which encloses end portions of the individual conductors 106, and a component 114 of an electrically conductive material (see in particular FIGS. 1, 4 and 5).

The crimp element 110 has been produced from a crimp element blank 116 illustrated in FIG. 2 in that, using a crimping tool (not shown), mutually opposing edge regions 118a, 118b are bent around the end portions 120, not provided with the covering 108, of the individual conductors 106 and pressed against the individual conductors 106 in such a way as to result in the crimp element 110 with the substantially B-shaped cross-section illustrated in FIGS. 1, 4 and 5.

During production of the crimp element 110, the end portions 120, enclosed by the crimp element 110, of the individual conductors 106 are compacted and pressed together in force-locking manner.

The resultant crimp element 110 comprises a continuous side 122 with an unbroken, substantially planar bearing surface 124 and a side opposite the continuous side 122, hereinafter designated discontinuous side 126, at which the curved edge regions 118a and 118b of the crimp element 110 lie opposite one another.

Provision is preferably made for the edge regions 118a and 118b to end at a short spacing from one another or to touch one another.

The crests of the edge regions 118a and 118b remote from the continuous side 122 of the crimp element 110 form two bearing surfaces 128a and 128b respectively of the discontinuous side 126 of the crimp element 110, which are spaced from one another in a transverse direction 130 of the crimp element 110 by an intermediate recess 132.

The base of the recess 132 is formed for example by the free edges 134a and 134b of the edge regions 118a or 118b respectively of the crimp element 110.

The transverse direction 130 of the crimp element 110 is oriented perpendicular to a longitudinal direction 136 of the crimp element 110, which direction extends substantially parallel to the longitudinal direction of the electrical line and substantially parallel to the free edges 134a and 134b of the crimp element 110.

The lateral free edges 134 of the crimp element 110 join a front edge 138 to a rear edge 140 of the crimp element 110.

For substance-to-substance bonding of the crimp element 110 to the component 114, the crimp element 110 may be applied in two different orientations to a contact surface 142 of the component 114, namely with the continuous side 122 facing the component 114, as shown in FIG. 4, or with the discontinuous side 126 facing the component 114, as shown in FIG. 5. In the case of the orientation illustrated in FIG. 4, the crimp element 110 is welded, for example by an ultrasonic welding process, along the entire planar bearing surface 124 of the continuous side 122, forming a weld zone 144.

In the case of the alternative orientation shown in FIG. 5, the crimp element 110 is welded, for example by an ultrasonic welding process, at the bearing surfaces 128a and 128b which are spaced from one another, forming two weld zones 146a and 146b which are spaced from one another in the transverse direction 130.

In the two alternative embodiments of the substance-to-substance bond according to FIGS. 4 and 5, the peel forces, i.e., the shear forces, needed to detach the crimp element 110 from the component 114 are very different, specifically the peel forces in the variant embodiment illustrated in FIG. 5, in which the crimp element 110 faces the component 114 with its discontinuous side 126, are markedly higher than in the variant embodiment illustrated in FIG. 4, in which the crimp element 110 rests with its continuous side 122 against the component 114.

The reason for this in particular resides in the greater localization of the energy input into the weld zones 146a, 146b between the crimp element 110 and the component 114 during substance-to-substance bonding and in the greater localization of the shear forces acting on the weld zones 146a, 146b in the orientation of the crimp element 110 relative to the component 114 shown in FIG. 5.

Since higher peel forces mean a more robust and durable bond between the crimp element 110 and the component 114, the crimp element 110 must therefore be applied to the component 114 in the orientation illustrated in FIG. 5 in order to achieve higher peel forces and thus a more robust substance-to-substance bond between the crimp element 110 and the component 114.

Figure 6:
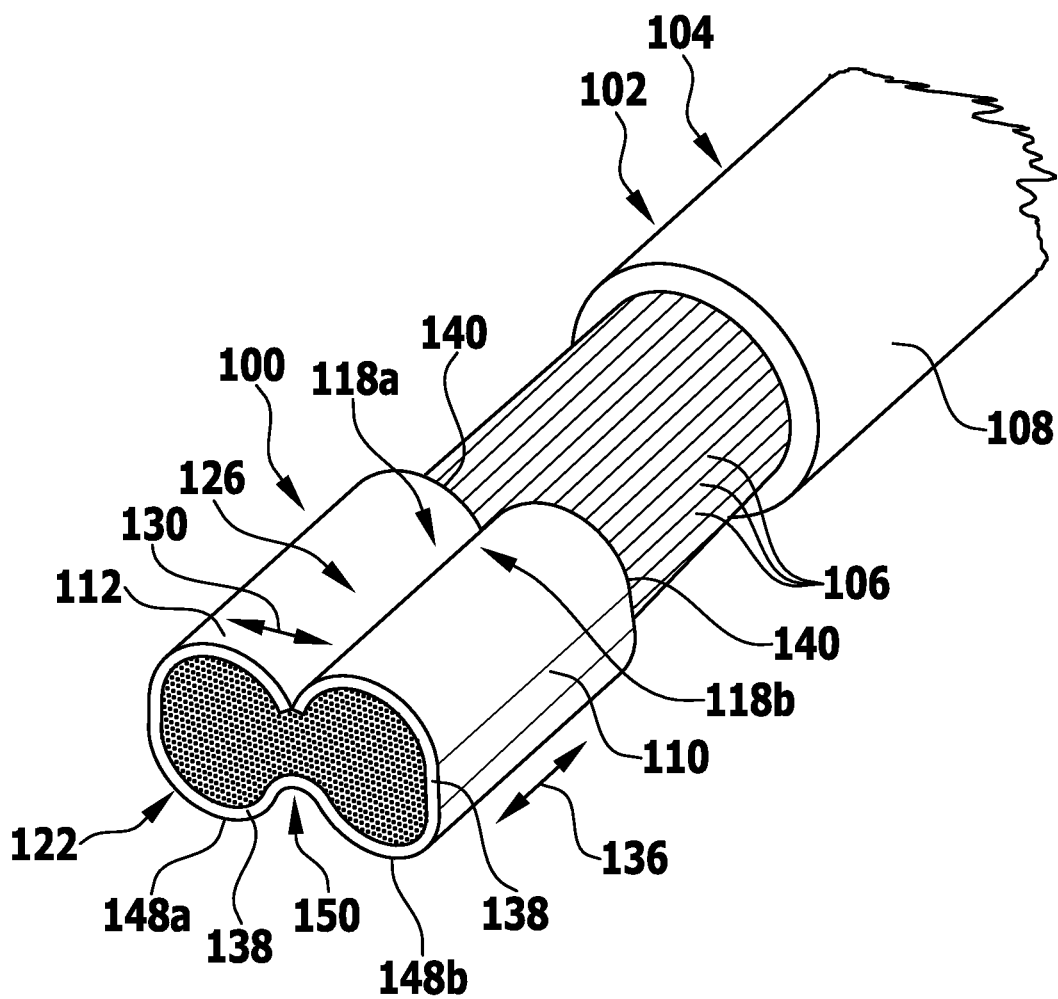
FIG. 6 is a schematic perspective representation of an end portion of an electrical line, which comprises a plurality of individual conductors, and a crimp element enclosing portions of the individual conductors, the continuous side of which crimp element comprises two bearing surfaces which are spaced from one another, at which the crimp element is substance-to-substance bondable to a contact surface of a component.
Figure 7:
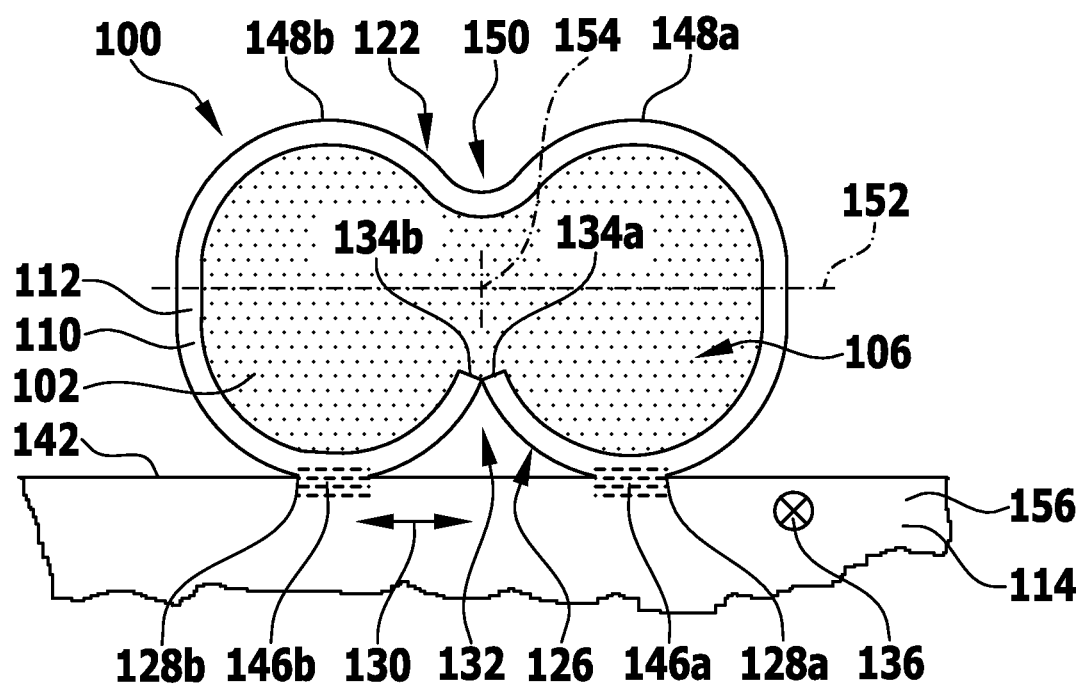
FIG. 7 shows a schematic section through an assembly, which comprises the electrical line and the crimp element of FIG. 6 and a component welded to the crimp element on the discontinuous side thereof.
Figure 8:
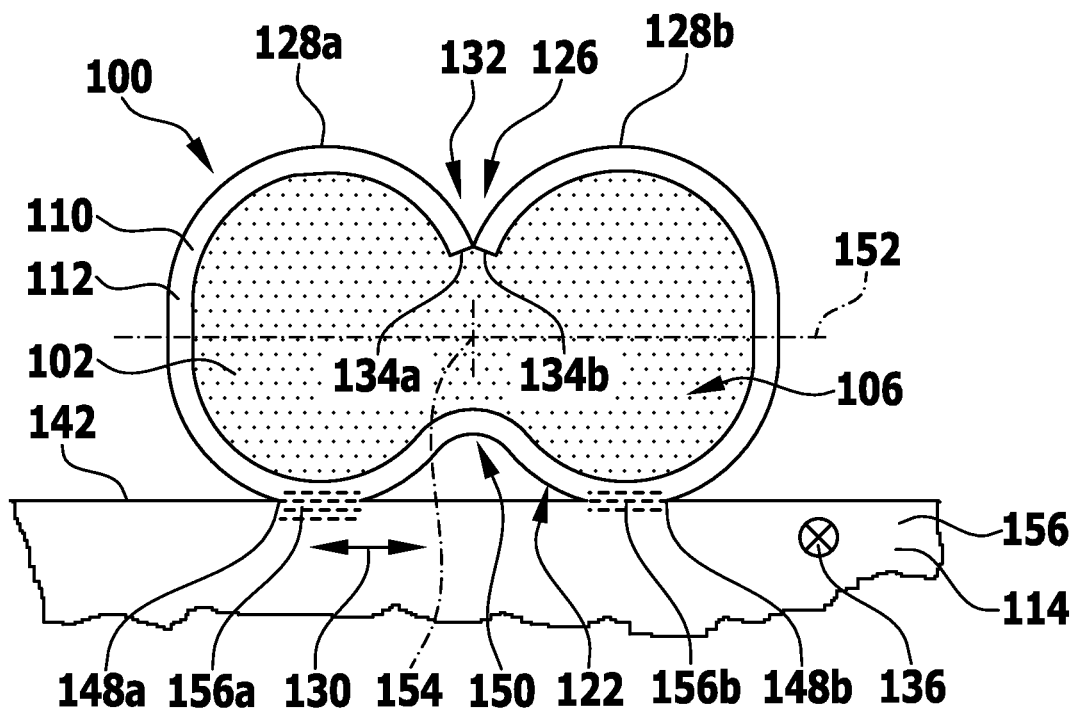
FIG. 8 shows a schematic section through an alternative embodiment of the assembly of FIG. 7, in which the component is welded to the crimp element on the continuous side thereof.

In the assembly 100 formed according to the invention and illustrated in FIGS. 6 to 8 of an electrical line 102 with individual conductors 106, a crimp element 110 and a component 114, the peel forces are on the contrary always substantially of equal magnitude, irrespective of whether the crimp element 110 is applied with its discontinuous side 126 against the component 114, as illustrated in FIG. 7, or with its continuous side 122, as illustrated in FIG. 8.

This is achieved in that the crimp element 110 is produced in such a way that the continuous side 122 of the crimp element 110 also comprises two bearing surfaces 148a and 148b which are spaced from one another, at which the crimp element 110 is substance-to-substance bondable with the contact surface 142 of component 114, wherein the bearing surfaces 148a and 148b are separated from one another in the transverse direction 130 of the crimp element 110 by a recess 150 arranged therebetween.

The recess 150 preferably extends from the front edge 138 of the crimp element 110 as far as to the rear edge 140 thereof.

The recess 150 is preferably produced during the crimping process, i.e., during production of the crimp element 110 from the crimp element blank 116, for example by impressing.

Impressing may proceed for example using a die provided in a crimping tool, which die is preferably substantially complementary in form to the recess 150.

The crimp element 110 preferably has substantially the same radius of curvature in the region of the bearing surfaces 148a and 148b of the continuous side 122 of the crimp element 110 as at the bearing surfaces 128a and 128b respectively of the discontinuous side 126 of the crimp element 110.

It is particularly favorable for the crimp element 110 to be substantially mirror-symmetrical with regard to the bearing surfaces 148a, 148b of the continuous side 122 of the crimp element 110 and the bearing surfaces 128a, 128b of the discontinuous side 126 of the crimp element 110 relative to a longitudinal central plane 152 of the crimp element 110 oriented parallel with the transverse direction 130 and parallel with the longitudinal direction 136 of the crimp element 110 and/or substantially rotationally symmetrical with regard to rotation of the crimp element 110 by 180° about a longitudinal center axis 154 of the crimp element 110 extending parallel to the longitudinal direction 136.

In this way it is ensured that the crimp element 110 is substance-to-substance bonded to the component 114, for example by an ultrasonic welding process, at two weld zones 156a and 156b spaced from one another in the transverse direction 130 of the crimp element 110 even if said crimp element is applied with its continuous side 122 against the component 114.

The weld zones 156a and 156b which bring about the substance-to-substance bond between the crimp element 110 and the component 114 when the crimp element 110 is applied with its continuous side 122 against the component 114 thus have substantially the same geometry as the weld zones 146a and 146b which bring about the substance-to-substance bond between the crimp element 110 and the component 114 when the crimp element 110 is applied with its discontinuous side 126 against the component 114, as illustrated in FIG. 7.

When using the crimp element 110 according to the invention, the peel forces are thus of substantially equal magnitude irrespective of the position of the crimp element 110 relative to the component 114 such that, when bonding the crimp element 110 to the component 114, it is not necessary to note whether the crimp element 110 is applied with the discontinuous side 126 or with the continuous side 122 against the component 114.

Assembly work is thereby significantly simplified.

In contrast with the substantially B-shaped crimp element 110 according to the prior art, as illustrated in FIGS. 1 to 5, the crimp element 110 according to the invention illustrated in FIGS. 6 to 8 has a cross-section which resembles the number 8.

Apart from the additional impressing of the recess 150 on the continuous side 122 of the crimp element 110, production of the crimp element 110 corresponds to the production process according to the prior art as explained above with reference to FIGS. 1 to 5.

A material which may be considered for the crimp element blank 116 is in principle any electrically conductive, workable material.

Preferably, the crimp element blank 116 is formed from a metallic material, for example from copper or a copper alloy.

The individual conductors 106 of the electrical line 102 may in principle also be formed from any material that has sufficient electrical conductivity.

The individual conductors 106 may in particular be formed from copper or a copper alloy.

Component 114 may in principle be formed from any material that has sufficient electrical conductivity.

Component 114 is preferably a constituent of a cell contacting system, with which cell terminals of electrochemical cells of an electrochemical device are bonded together.

Provision may in particular be made for component 114 to be a cell connector 156 which serves to electrically conductively bond cell terminals of various electrochemical cells of an electrochemical device.

Such a cell connector 156 is preferably formed from an electrically conductive metallic material, for example from copper or a copper alloy or from aluminum or an aluminum alloy.

The electrically conductive bond between the electrical line 102 and such a cell connector 156 may in particular serve to transfer the electrical potential prevailing at the connection point of the cell connector 156 via the electrical line 102 to a monitoring device of the electrochemical device.

An assembly 100 according to the invention of the above-described type may furthermore be used to produce an electrically conductive bond between a temperature sensor and a monitoring device of the electrochemical device.

The invention claimed is:

1. A method for producing an electrically conductive bond between an electrical line, which comprises a plurality of individual conductors, and an electrically conductive component, comprising the following:

producing from a crimp element blank a crimp element enclosing portions of the individual conductors, the crimp element comprising a continuous side and a discontinuous side, at which edge regions of the crimp element lie opposite one another; and substance-to-substance bonding of the crimp element at the continuous side thereof with a planar contact surface of the component;

wherein the crimp element is produced in such a way that the discontinuous side of the crimp element comprises two bearing surfaces which are formed by crests of the edge regions of the crimp element and are spaced from one another in a transverse direction of the crimp element by an intermediate recess formed on the discontinuous side of the crimp element, wherein the crimp element is substance-to-substance bondable to the contact surface of the component at said bearing surfaces on the discontinuous side of the crimp element, and that the continuous side of the crimp element comprises two bearing surfaces which are spaced from one another in the transverse direction of the crimp element, wherein the crimp element is substance-to-substance bondable to the contact surface of the component at said bearing surfaces on the continuous side of the crimp element, wherein a recess is produced on the continuous side of the crimp element before the crimp element comes into contact with the contact surface of the component, wherein the recess extends from a front edge of the crimp element to a rear edge of the crimp element, wherein the crimp element is substance-to-substance bonded to the contact surface of the component by an ultrasonic welding process at the bearing surfaces on the continuous side of the crimp element between the front edge and the rear edge of the crimp element, and wherein said bearing surfaces on the continuous side of the crimp element are arranged on an outer surface of the crimp element, facing away from the individual conductors of the electrical line.

2. The method according to claim 1, wherein the recess is produced by impressing.

3. The method according to claim 1, wherein the crimp element has a cross-section which resembles the number 8.

4. The method according to claim 1, wherein the crimp element blank contains a metallic material.

5. The method according to claim 1, wherein substance-to-substance bonding of the crimp element with the component proceeds by a welding process.

6. The method according to claim 1, wherein the component is formed as a cell connector for electrically conductively bonding cell terminals of electrochemical cells of an electrochemical device.

* * * * *

UNITED STATES PATENT AND TRADEMARK OFFICE
CERTIFICATE OF CORRECTION

PATENT NO. : 10,833,426 B2  
APPLICATION NO. : 14/804989  
DATED : November 10, 2020  
INVENTOR(S) : Hoenle et al.

Page 1 of 1

It is certified that error appears in the above-identified patent and that said Letters Patent is hereby corrected as shown below:

On the Title Page

Item "(72) Inventors:," the city for the third inventor should appear as follows:  
Moritz Bertsch, Dettingen/Erms (DE);

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*